United States Patent [19]

Suzuki

[11] 4,158,161
[45] Jun. 12, 1979

[54] APPARATUS FOR GUIDING A WELDER OR THE LIKE ALONG A PREDETERMINED PATH

[76] Inventor: Kanekichi Suzuki, 55-6, 6-chome, Kameido, Koto-ku, Tokyo, Japan

[21] Appl. No.: 856,184

[22] Filed: Nov. 30, 1977

[30] Foreign Application Priority Data

May 14, 1977 [JP] Japan .................................. 52/55583
Jul. 22, 1977 [JP] Japan ........................... 52/98186[U]

[51] Int. Cl.² ........................... G05D 1/00; B23K 9/12
[52] U.S. Cl. ............................... 318/578; 219/124.34; 228/9; 228/45; 318/652; 318/673
[58] Field of Search ................... 219/124.34; 228/8, 9, 228/45; 318/576, 578, 652, 672, 673

[56] References Cited

U.S. PATENT DOCUMENTS

| 3,171,012 | 2/1965 | Morehead | 219/124.34 |
| 3,408,475 | 10/1968 | Fier | 219/124.34 |
| 3,452,180 | 6/1969 | Bollinger et al. | 219/124.34 |
| 3,530,273 | 9/1970 | Bollinger et al. | 219/124.34 |
| 3,594,540 | 7/1971 | Weinfurt | 219/124.34 |
| 3,596,048 | 7/1971 | Maeda et al. | 228/8 |
| 3,997,757 | 12/1976 | Cecil et al. | 219/124.34 |
| 4,010,346 | 3/1977 | Cecil et al. | 219/124.34 |

OTHER PUBLICATIONS

Cecil Equipment Co., publication, 6/1976.

Primary Examiner—Bruce A. Reynolds
Assistant Examiner—Clifford C. Shaw
Attorney, Agent, or Firm—George B. Oujevolk

[57] ABSTRACT

Sensing apparatus is disclosed which is particularly useful for guiding a welding torch along a seam or joint to be welded. The sensing apparatus comprises a sensor assembly for sensing variations in the welding path, a first drive mechanism for moving the sensor assembly and the welding torch in the opposite transverse direction (i.e., toward the right and left) of the path, and a second drive mechanism for moving the sensor assembly and the welding torch toward and away from the path. For controlling the operation of the drive mechanism in accordance with electrical signals produced by the sensor assembly, three control circuits are provided which can be selectively employed for operating the apparatus in either the two-way sensing, right hand sensing, or left hand sensing mode. The two-way sensing mode is suitable for a butt weld, and the right or the left hand sensing mode for a lap weld and fillet weld.

6 Claims, 31 Drawing Figures

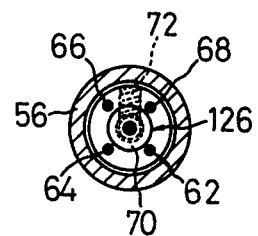
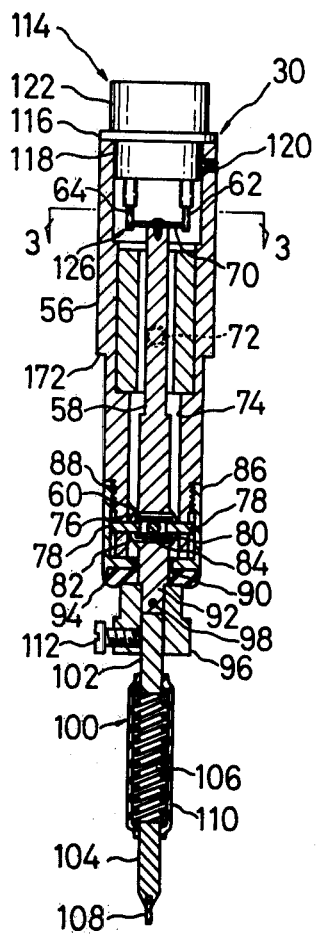
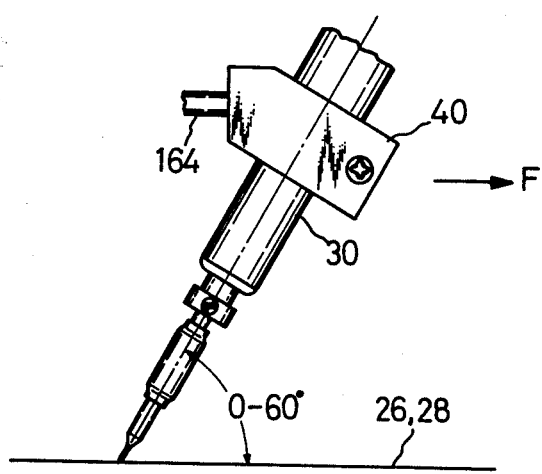

FIG.5
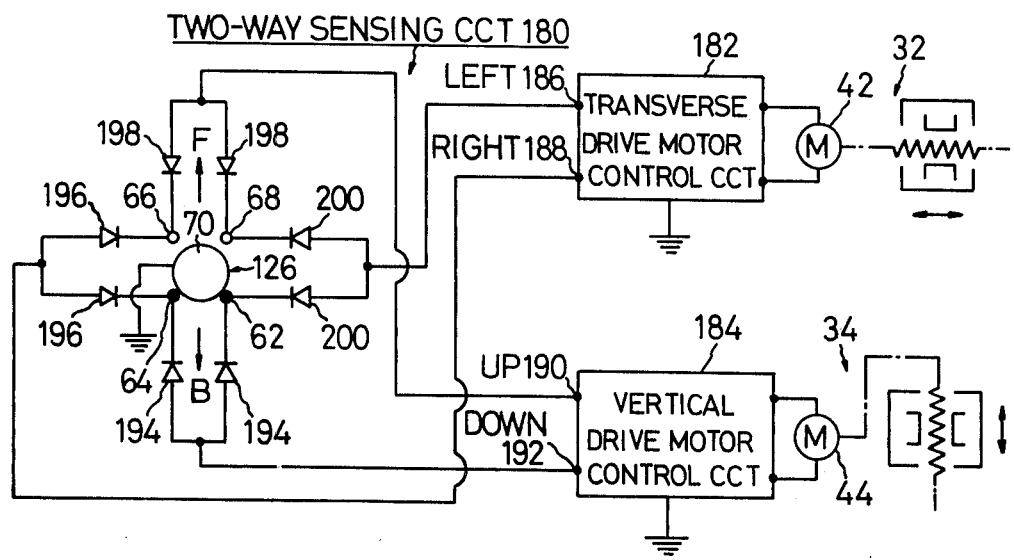
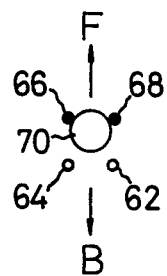
FIG.6A
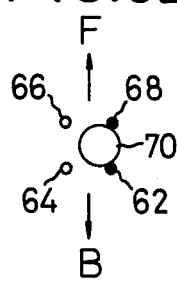
FIG.6B
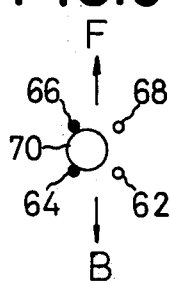
FIG.6C
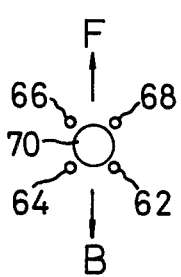
FIG.6D
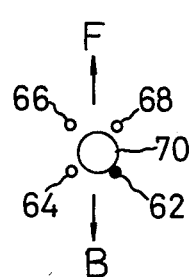
FIG.6E
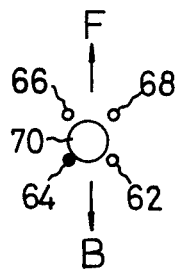
FIG.6F
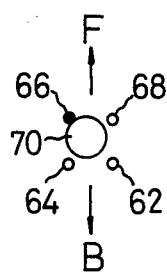
FIG.6G
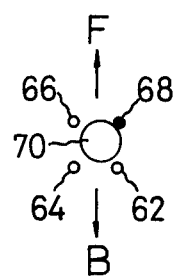
FIG.6H

APPARATUS FOR GUIDING A WELDER OR THE LIKE ALONG A PREDETERMINED PATH

BACKGROUND OF THE INVENTION

1. Field of the Invention

My invention relates to apparatus for guiding a piece of equipment along a predetermined path and for controlling the movement of such a piece upon sensing variations in the path. More specifically, my invention is directed to such sensing and guiding apparatus particularly well adaptable for guiding a welding head such as a torch along a groove or other seam or joint formed by abutting or lapping pieces of work to be welded. In the following, therefore, my invention is described in terms of this specific adaptation, but with no unnecessary limitations thereto being intended.

2. Description of the Prior Art

Sensing devices in current use for guiding a welding head along a seam or joint to be welded are mostly of the "one-way sensing" type, meaning that the sensor is normally biased toward the right ("right hand sensing" type) or the left ("left hand sensing" type) with respect to its predetermined traveling direction along the seam, besides being biased in a direction normal to the rightward or leftward direction. An example of such one-way sensing and guiding apparatus is described and claimed in my Japanese Patent Application No. 51-26303 filed on Mar. 11, 1976. This prior art apparatus is so simple in construction that it can be minimized in size and weight and can also be manufactured economically without any sacrifice of reliability of operation.

Being of the one-way sensing type, however, the prior art apparatus is effective only for such types of welds as a lap weld or fillet weld, and not for a butt weld, in which latter case the sensor arm or finger of the apparatus is required to follow a relatively shallow groove defined by the abutting edges of coplanar pieces of sheet metal to be welded. Particularly in the case of a V-type butt weld, for example, the follower tip of the sensor arm is very likely to travel along the groove off its median line, that is, in sliding contact with only one of the opposite sloping surfaces defining the groove, thereby causing the following welding head to poorly weld the joint. Moreover, once the sensor arm of the one-way sensing apparatus accidentally moves out of proper sensing engagement with the groove, the sensor starts traveling either rightward or leftward away from the groove, resulting in an utter failure in welding operation.

SUMMARY OF THE INVENTION

It is an object of my invention to provide apparatus of the novel "two-way sensing" type for guiding a desired piece of equipment along a predetermined path, such that the above noted problems encountered with the prior art one-way sensing type apparatus are thoroughly overcome.

Another object of my invention is to provide sensing and guiding apparatus which, in addition to operation in the two-way sensing mode, can also be operated in the one-way sensing mode to adapt the apparatus for a variety of uses.

A further object of my invention is to provide sensing and guiding apparatus which can be operated in either the two-way, right hand, or left hand sensing mode as desired.

A further object of my invention is to provide sensing and guiding apparatus of such universal type which can be readily switched from one sensing mode to another.

A still further object of my invention is to provide sensing and guiding apparatus of the universal type which is of particular utility when incorporated with welding machines of various types, because the welding head can be guided along a desired path in a sensing mode best suited for the specific type of weld to be made.

Briefly, the sensing and guiding apparatus in accordance with my invention comprises a sensor assembly for sensing variations in a path, first drive means for moving the sensor assembly andd a guided piece of equipment (e.g., a welding head) in the opposite transverse or lateral directions (i.e., toward the right and left) of the path, second drive means for moving the sensor assembly and the guided piece toward and away from the path, with the directions of movement of the sensor assembly and the guided piece by the second drive means being normal to the directions of their movement by the first drive means, and electrical circuit means for controlling the operation of the first and the second drive means so as to maintain the guided piece on the path in spite of variations therein.

The sensor assembly comprises an arm or finger pivotally mounted within a hollow body and having a movable contact thereon which is selectively engageable with any one or two adjacent ones of four fixed contacts on the sensor body depending upon a direction in which the sensor arm is pivoted by variations in the path. The movable contact is normally spring or otherwise biased into engagement with two preselected adjacent ones of the four fixed contacts.

Preferably, the electrical circuit means comprises a two-way sensing circuit, a right hand sensing circuit, and a left hand sensing circuit which can be selectively employed to control the operation of the first and the second drive means in accordance with signals supplied from the sensor assembly. During operation in the two-way sensing mode, the sensor assembly and the guided piece ae normally biased to be moved toward the path by the second drive means and held in neutral with respect to the transverse directions of the path, so that this sensing mode is suitable for a butt or similar weld.

During operation in the right or the left hand sensing mode, the sensor assembly and the guided piece are normally biased to be moved in either of the opposite transverse directions of the path by the first drive means and further toward the path by the second drive means. The right or the left hand sensing mode may therefore be selected for a lap, fillet or like weld. It is thus seen that the apparatus according to my invention can be operated in any of the three different sensing modes best suited for a particular type of weld to be made, not only for guiding the welding head along the seam or joint but also for positioning the head thereon at the start of each welding operation.

The above and other objects, features and advantages of my invention and the manner of attaining them will become more readily apparent, and the invention itself will best be understood, upon consideration of the following description and appended claims, with reference had to the accompanying drawings.

BRIEF DESCRIPTION OF THE DRAWINGS

FIG. 2 is an enlarged, axial sectional view of the sensor assembly used in the apparatus of FIG. 1;

FIG. 3 is a cross sectional view of the sensor assembly taken along the line 3—3 of FIG. 2 and showing in particular the sensor switch provided therein;

FIG. 4 is a fragmentary elevational view of the sensor assembly and its holder, the view being explanatory of the angular orientation of the sensor assembly with respect to the welding path;

FIG. 5 is a schematic electrical diagram of the two-way sensing circuit in the apparatus of FIG. 1;

FIGS. 6A through 6H are schematic representations of the sensor switch of FIG. 3 which are explanatory of the various operating positions of the movable contact with respect to the fixed contacts when the apparatus is in the two-way sensing mode;

DESCRIPTION OF THE PREFERRED EMBODIMENT

General

Figure 1:
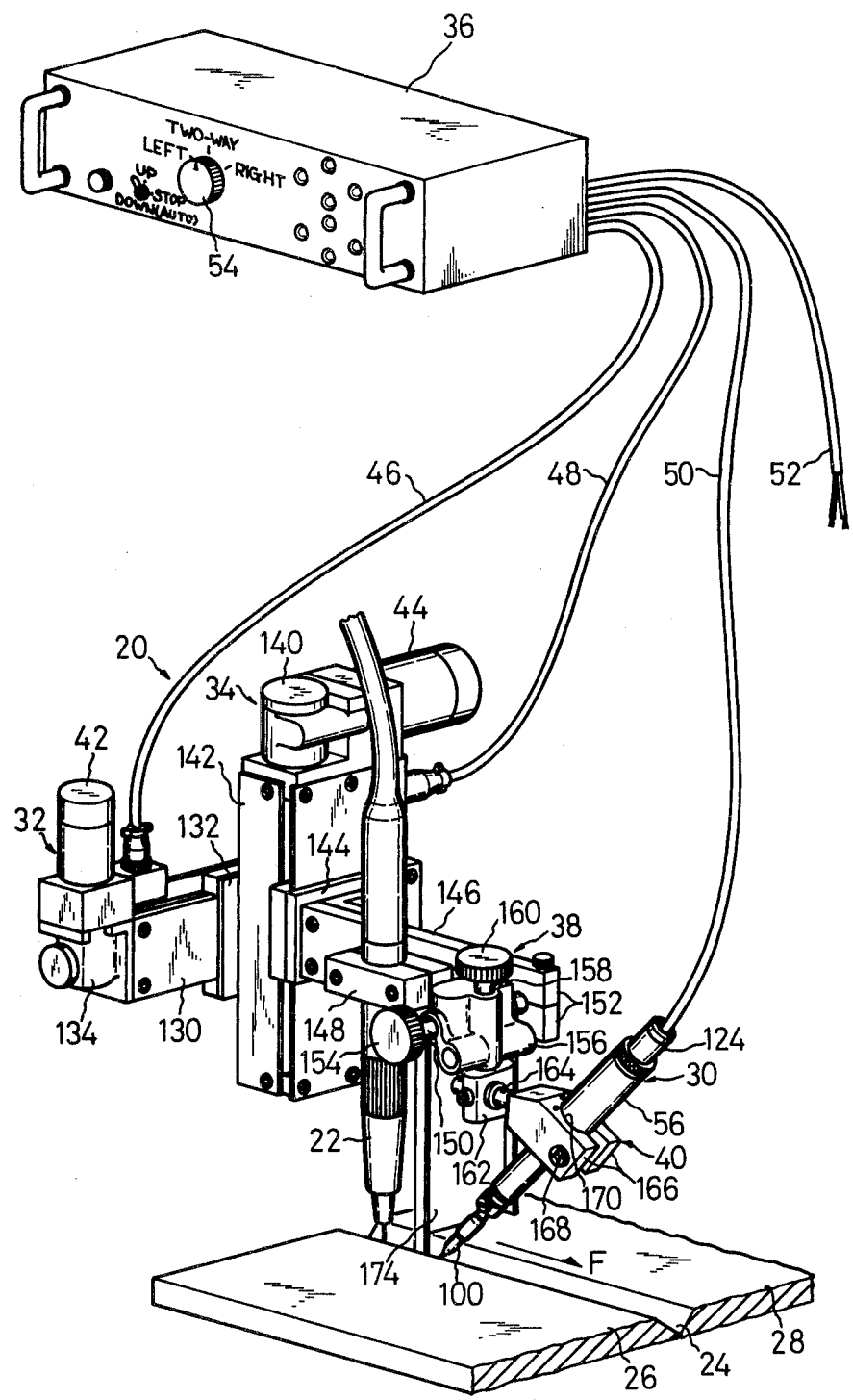
FIG. 1 is a perspective view of the sensing and guiding apparatus constructed in accordance with my invention, the apparatus being shown in conjunction with a welding torch and two coplanar pieces of sheet metal to be butt-welded.

In FIG. 1 of the accompanying drawings, the sensing and guiding apparatus embodying my invention is generally designated 20 and is shown adapted for guiding a welding torch 22 along a groove 24 of the single V type formed by and between two coplanar pieces 26 and 28 of sheet metal to be butt-welded. In the following description, the directional terms "upward" and "downward" are employed with the understanding that the two sheet metal pieces 26 and 28 are disposed horizontally under the apparatus 20. Further, the terms "right" and "left", or "rightward" and "leftward", are used as the apparatus is viewed in the arrow marked direction F in which the welding torch 22 is to travel along the groove 24 for welding the joint. Thus, for example, the sheet metal piece 26 can be thought of as being located on the right hand side of the welding torch 22, and the other piece 28 on the left hand side of the torch.

Broadly, the sensing and guiding apparatus 20 in accordance with my invention comprises a sensor assembly 30 for sensing variations in the joint 24 between the two sheet metal pieces 26 and 28, a first or transverse drive mechanism 32 for moving the sensor assembly horizontally in the opposite transverse or lateral directions of the joint, a second or vertical drive mechanism 34 for moving the sensor assembly vertically up and down with respect to the joint, and a control console 36 containing electrical circuitry for controlling the operation of the transverse and the vertical drive mechanisms in order to maintain the welding torch 22 on the path.

The sensor assembly 30 is bracketed to the vertical drive mechanism 34 via manual adjuster 38 and sensor holder 40 and precedes the welding torch 22 for guiding same along the groove 24 in the direction of the arrow F. The complete vertical drive mechanism 34 is moved transversely of the groove 24 by the transverse drive mechanism 32. For the desired movement of the welding torch 22 and the sensor assembly 30 along the groove 24, the transverse drive mechanism 32 is attached to a suitable carriage, not shown, that travels along the groove.

The transverse and the vertical drive mechanisms 32 and 34 include electrically controlled actuators such as reversible direct-current motors 42 and 44, respectively, that are connected to the circuitry within the control console 36 via respective cables or cords 46 and 48. The sensor assembly 30 is also electrically connected to the control circuitry via cable 50. The operation of the reversible motors 42 and 44 is controlled by the control circuitry in accordance with the signals supplied thereto from the sensor assembly 30. Shown at 52 is an additional cable for electrically connecting the control console 36 to a power supply.

In this particular embodiment of my invention, the circuitry within the control console 36 comprises three control circuits which can be selectively employed to set the apparatus 20 in either of the above explained two-way sensing mode, right hand sensing mode, and left hand sensing mode. For the selective use of these three control circuits, mode selector switches are provided, as will be described later, which can be operated by a knurled knob 54 on the front panel of the control console 36.

Sensor Assembly

As illustrated in detail in FIGS. 2 and 3, the sensor assembly 30 broadly comprises a hollow cylindrical body 56, an arm or rod 58 mounted within the body via a universal pivot 60, four fixed contact pins 62, 64, 66 and 68 supported at the top end of the sensor body, a movable contact 70 mounted on the top end of the sensor arm for selective engagement with the four fixed contact pins, and a coiled compression spring 72 normally biasing the movable contact into engagement with two preselected adjacent ones 62 and 64 of the fixed contact pins.

The sensor body 56 has a stepped bore 74 extending axially therethrough for loosely receiving the sensor arm 58. Located in the bore 74 at or adjacent the bottom end of the sensor body 56, the pivot 60 supports the sensor arm 58 at a point intermediate both extremities thereof. This pivot comprises a first pivot pin 76 provided with a pair of collinear journals 78 rotatably supported by the sensor body 56 and oriented at right angles with the sensor body axis. The first pivot pin 76 is received with substantial clearance in a transverse bore 80 formed in a spherical enlargement 82 of the sensor arm 58, and this enlargement is rotatably connected to the first pivot pin by a second pivot pin 84 extending in right angular relationship thereto. Pivoted in this manner, the sensor arm 58 is rotatable in any direction about a common axis to move the movable contact 70 thereon into engagement with any one or two adjacent ones of the fixed contacts 62, 64, 66 and 68.

The bottom end of the sensor body 56 is closed by a cap 86 which is threadedly engaged with the sensor body at 88. The cap 86 has a clearance hole 90 formed axially therethrough to permit the lower end portion 92 of the sensor arm 58 to project out of the sensor body 56. A seal of rubber sponge or like elastic material is provided at 94 to dust-tightly seal the bottom end of the sensor body 56 while permitting pivotal movement of the sensor arm 58.

Projecting out of the sensor body 56, the sensor arm 58 has its end portion 92 inserted into a coupling 96 and secured thereto as by means of a pin 98. This coupling is intended to removably secure a follower unit 100 in collinear relationship to the sensor arm 58.

The follower unit 100 comprises upper and lower rod-like portions 102 and 104 collinearly connected to each other via relatively rigid but suitably flexible means such as a coil spring 106. A follower pin or stylus 108 of antifriction material is embedded in and extends downwardly from the lower rod-like portion 104 for sensing contact with the groove 24 formed by the sheet metal pieces 26 an 28 to be welded. Preferably, the upper and lower rodlike portions 102 and 104 and the coil spring 96 should be enclosed in a sheath 110, as of heat resisting rubber, by way of protection from spatter that may be expelled during welding operation. The upper rodlike portion 102 is inserted into the coupling 96 and is secured thereto as by means of a screw 112.

Although the follower stylus 108 or its equivalent means may be embedded in or otherwise secured directly to the projecting end of the sensor arm 58, the illustrated construction is preferable because it permits ready replacement of the follower unit 100 which is subject to rapid aging. Furthermore, since the follower unit is readily replaceable, the unit may be disposed sufficiently close to the welding torch 22 for accurately guiding same along the groove 24, only if the operator or supervisor does not mind taking the trouble of rather frequently replacing the unit.

It is also be noted that the coil spring 106 of the follower unit 100 must have sufficient rigidity to permit ready pivoting of the sensor arm 58 when normal variations in the welding path are encountered. The coil spring can be replaced by any other means capable of performing the same function, that is, the protection of the fixed contact pins and other parts of the sensor assembly from damage which might be caused by extreme rotation of the sensor arm upon encountering any excessive variation in the path.

On the top end of the sensor body 56, the four contact pins 62, 64, 66 and 68 are fixedly supported by a holder 114 of relatively rigid and electrically insulating material such as plastics. The contact pin holder 104 is cylindrical in shape, including a flange 116 located at the midpoint of its axial dimension. The holder portion 118 under the flange 116 is closely fitted in the sensor body 56 and retained in a predetermined angular position relative to the sensor body by a set screw 120. The holder portion 122 over the flange 116 is formed into a receptacle for engagement with the plug 124, FIG. 1, on the cable 50 in order to establish electrical connection between the four fixed contact pins and the circuitry within the control console.

The four fixed contact pins 62, 64, 66 and 68 ae supported by the holder 104 at constant circumferential spacings of 90 degrees about the axis of the sensor body 56 and extend downwardly from the holder. Surrounded by these four fixed contact pins, the movable contact 70 is shown to be in the form of a disk of metal which is suitably affixed to the top end of the sensor arm 58 in axial alignment therewith. The disklike movable contact 70 has a diameter slightly greater than the spacing between any two adjacent ones of the fixed contacts, so that the movable contact is engageable with any two adjacent fixed contacts, besides being engageable with one and each of them. The movable contact 70 may not necessarily be disklike in shape but may, for example, be in the shape of a square having an area slightly less than the square area defined by the four fixed contacts.

The four fixed contacts 62, 64, 66 and 68 and the movable contact 70 constitute in combination a multiple-contact switch (hereinafter referred to as the sensor switch) generally designated 126. The functions of this sensor switch will become apparent as the description proceeds. The movable contact 70 of the sensor switch 126 must be maintained at ground potential during operation of the apparatus 20. To this end, all but the sheath 110 of the constituent members of the sensor arm assembly, including the follower unit 100, may be made of electrically conducting material, in order that the sheet metal pieces 26 and 28 to be welded may serve as the ground.

Preferably, however, the movable contact 70 of the sensor switch 126 should be grounded via the compression spring 72 and the sensor body 56. This second measure has the advantage that the movable contact 70 can be held at ground potential even when the follower stylus 108 is out of contact with the parent metal and, as a consequence, that the apparatus is maintained in operable condition either when the follower stylus is in or out of contact with the parent metal.

Installed between sensor body 56 and sensor arm 58, at a point above the pivotal mounting 60 of the latter, the compression spring 72 biases the sensor arm in a predetermined direction which right-angularly crosses the midpoint of a notional line between the two preselected adjacent ones 62 and 64 of the four fixed contact pins. The movable contact 70 on the sensor arm 58 is therefore normally held in engagement with these two preselected fixed contact pins 62 and 64, for purposes which will become apparent from the subsequent description of the control circuitry of this apparatus. It will of course be seen that the compression spring 72 can be replaced by magnetic and other suitable biasing means.

Transverse Drive Mechanism

With reference back to FIG. 1, the transverse drive mechanism 32 includes the reversible electric motor 42 mounted on a guide 130. This guides is intended to provide a linear guideway for a slide or carriage 132, with the guideway extending transversely of the groove 24 in parallel relationship to the plane of the sheet metal pieces 26 and 28. The guide 130 is secured to the unshown carriage movable along the groove 24. The carriage 132 of the transverse drive mechanism 32 is slidably mounted on the guide 130 and is to be moved in either direction therealong by the motor 42.

The transverse drive motor 42 has its output shaft coupled to a speed reducer 134, which may comprise worm gearing, and thence to a threaded shaft, not seen in FIG. 1, that is rotatably supported by guide 130. An internally threaded member, also not seen, is fitted over the unseen threaded shaft and is secured to the carriage 132. Thus, as the transverse drive motor 42 is set in rotation in either direction by a control signal from the console 36, the carriage 132 travels in the corresponding direction along the guide 130, as will be later described in more detail.

Vertical Drive Mechanism

The vertical drive mechanism 34 is so named simply because, in this particular embodiment, the sheet metal pieces 26 and 28 are assumed to be disposed in a horizontal plane. In practice, the direction of the movement of the welding torch 22 and sensor assembly 30 effected by this drive mechanism may not necessarily be vertical, depending upon the disposition of workpieces to be welded.

As will be seen also from FIG. 1, the vertical drive mechanism 34 is of essentially identical construction with the transverse drive mechanism 32, comprising the reversible electric motor 44 having a speed reducer 140, a guide 142 providing a guideway extending normal to the plane of the sheet metal pieces 26 and 28, and a slide or carriage 144 slidably mounted on the guide for up-and-down movement along the guideway. Also as in the transverse drive mechanism 32, the speed reducer 140 is coupled to a threaded shaft rotatably supported by the guide 142, and an internally threaded member secured to the carriage 144 is fitted over this threaded shaft. It is therefore apparent that the carriage 144 slides up or down along the guide 142 as the vertical drive motor 44 is set in rotation in either direction by a control signal from the console 36.

The carriage 144 has a mounting bracket 146 extending forwardly therefrom, that is, in the predetermined traveling direction F of the welding torch 22 and sensor assembly 30 along the joint 24. The welding torch 22 is clamped onto the mounting bracket 146 by a torch holder 148 so as to extend downwardly therefrom for welding the joint 24 in the known manner as the torch is guided therealong. The sensor assembly 30 is mounted on the front tip of the mounting bracket 146 in the manner hereinafter set forth.

The guide 142 of the vertical drive mechanism 34 is secured to the carriage 132 of the transverse drive mechanism 32, so that the complete vertical drive mechanism is moved transversely of the joint 24 by the transverse drive mechanism. It is thus seen that the welding torch 22 and sensor assembly 30 can be moved as desired with respect to the joint 24 by both transverse and vertical drive mechanisms 32 and 34 as they are fed along the joint by the unshown feed mechanism.

It is to be understood that the illustrated arrangement of the transverse and the vertical drive mechanisms 32 and 34 is purely by way of example and is subject to a variety of alterations. For example, the guide 142 of the vertical drive mechanism may be secured to the unshown carriage, and the transverse drive mechanism may be mounted on the carriage 144 of the vertican drive mechanism. Such specific arrangements of the transverse and the vertical drive mechanisms may be suitably selected depending upon particular applications of this apparatus.

Sensor Assembly Mounting

The sensor assembly 30 is mounted as aforesaid on the front tip of the mounting bracket 146 via the manual adjuster 38 and the sensor holder 40. Intended for fine adjustment of the position of the sensor assembly 30, or of its follower stylus 108, in relation to the position of the welding torch 22 with respect to the groove 24, the manual adjuster 38 includes a transverse shaft 150 which is rotatably and detachably supported at one end by a pair of gripping jaws 152 formed at the tip of the mounting bracket 146 and which extends transversely of the groove 24 and parallel to the plane of the sheet metal pieces 26 and 28. The transverse shaft 150 terminates at the other end in a knurled knob 154 which is to be turned manually for adjustably moving a slide block 156 slidably mounted on the transverse shaft and threadedly engaged therewith.

Disposed normal to the transverse shaft 150, a vertical shaft 158 is carried by the slide block 156 and is threadedly engaged therewith. This vertical shaft is also provided with a knurled knob 160 at its top end, by the manual turn of which the vertical shaft can be adjustably moved in its longitudinal direction relative to the slide block 156. The vertical shaft 158 has its bottom end connected via a connector 162 to a short connecting rod 164 extending forwardly therefrom in right angular relationship to the vertical shaft. The connecting rod 164 is secured to the sensor holder 40 embracing the sensor assembly 30. It is thus seen that the position of the sensor assembly 30 relative to the welding torch 22 and the groove 24 can be adjustably varied by manually turning either or both of the knobs 154 and 160 in a desired direction.

The sensor holder 40 is formed to include a pair of gripping jaws 166 which can be tightened or loosened by means of a screw 168. The gripping jaws 166 define therebetween a bore 170 for receiving the body 56 of the sensor assembly 30. As will be seen upon reference to FIG. 2, the lower portion of the sensor body 56 is made slightly less in diameter than its upper portion to provide an annular stop or abutment 172. The bore 170 of the sensor holder 40 has a diameter, when the screw 168 is loosened, sufficiently great to slidably receive the reduced diameter portion of the sensor body 56. Thus, for mounting the sensor assembly 30 on the sensor holder 40, the former may be slid into the bore 170 of the latter from above, while the screw 168 is loosened, until the annular stop 172 of the sensor body 56 is engaged by the sensor holder. The sensor assembly 30 can be secured to the sensor holder 40 as the screw 168 is subsequently tightened to force the gripping jaws 166 against the sensor body.

As best depicted in FIG. 4, the sensor holder 40 is set at such an angle to the connecting rod 164 that, when the connecting rod is disposed parallel to the plane of the sheet metal pieces 26 and 28, the sensor assembly 30 carried by the sensor holder may be inclined forwardly or in its traveling direction F. In practice, the angle between the sensor axis and the sheet metal plane can range from 0 up to about 60 degrees. Furthermore, if desired, the angle between the sensor axis and the sheet metal plane may also be made variable in the transverse direction of the groove 24.

Seen at 174 in FIG. 1 is a screen installed between welding torch 22 and sensor assembly 30 for protecting the latter from spatter or heat produced by the former. The screen 174 may be secured to the slide block 156 of the manual adjuster 38 in any convenient manner.

Electrical Circuitry

The electrical circuitry of this sensing and guiding apparatus 20 is broadly composed of a two-way sensing circuit, a right hand sensing circuit, and a left hand sensing circuit, which are to be switched from one to another by the knob 54 on the control console 36. For the clarity of respresentation, the three sensing circuits are illustrated individually in FIGS. 5, 8 and 10 and will hereinafter be described in detail under the respective headings.

Two-Way Sensing Circuit

In the two-way sensing circuit shown diagrammatically in FIG. 5 and therein generally labeled 180, the movable contact 70 of the sensor switch 126 is biased by the compression spring 72 in the direction indicated by the arrow B, which direction is substantially opposite to the traveling direction F of the sensing apparatus along the groove 24. The term "substantially" is used because the sensor assembly 30 is usually inclined in the traveling direction F.

It will be noted from FIG. 5 that the reversible electric motors 42 and 44 of the transverse and the vertical drive mechanisms 32 and 34 are adapted to be individually controlled by respective motor control circuits 182 and 184 of known design each having its output terminals connected to the opposite polarity terminals of the corresponding motor. The transverse drive motor control circuit 182 has two input terminals 186 and 188, and the vertical drive motor control circuit 184 has two input terminals 190 and 192, which input terminals are all connected to the four fixed contacts 62, 64, 66 and 68 of the sensor switch 126 in the manner hereinafter set forth.

The transverse drive motor control circuit 182 is such that when its input terminal 186 is grounded, the transverse drive motor 42 is assumed to be set in rotation in a forward direction, resulting in the leftward sliding movement of the carriage 132 along the guide 130. This input terminal 186 is therefore hereinafter referred to as the LEFT input terminal. When the other input terminal 188 of the transverse drive motor control circuit 182 is grounded, the transverse drive motor 42 is set in reverse rotation, resulting in the rightward movement of the carriage 132 along the guide 130. This input terminal 188 is therefore hereinafter referred to as the RIGHT input terminal. When both LEFT and RIGHT input terminals 186 and 188 are grounded, the transverse drive motor 42 is held out of rotation.

Similarly, when the input terminal 190 of the vertical drive motor control circuit 184 is grounded, the vertical drive motor 44 is assumed to be set in forward rotation, resulting in the upward sliding movement of the carriage 144 along the guide 142. This input terminal 190 is therefore hereinafter referred to as the UP input terminal. When the other input terminal 192 of the vertical drive motor control circuit 184 is grounded, the vertical drive motor 44 is set in reverse rotation, resulting in the downward movement of the carriage 144 along the guide 142. This input terminal 192 is therefore hereinafter referred to as the DOWN input terminal. When both UP and DOWN input terminals 190 and 192 are grounded, the vertical drive motor 44 is held out of rotation.

In this two-way sensing circuit 180, each of the four fixed contacts of the sensor switch 126 pairs up with an adjacent one, and each such pair of fixed contacts are connected in parallel relationship to one of the input terminals of the transverse and the vertical drive motor control circuits 182 and 184 via a reverse blocking diode connected in series with each fixed contact. More specifically, the two adjacent fixed contacts 62 and 64 are connected to the DOWN input terminal 192 of the vertical drive motor control circuit via diodes 194. The fixed contacts 64 and 66 are connected to the RIGHT input terminal 188 of the transverse drive motor control circuit 182 via diodes 196. The fixed contacts 66 and 68 are connected to the UP input terminal 190 of the vertical drive motor control circuit 184 via diodes 198. The fixed contacts 62 and 68 are connected to the LEFT input terminal 186 of the transverse drive motor control circuit 182 via diodes 200. As mentioned, the movable contact 70 of the sensor switch 126 is maintained at ground potential.

FIG. 5 shows the movable contact 70 in engagement with the two aforesaid preselected fixed contacts 62 and 64 under the bias of the compression spring 72. This represents the normal condition in which the sensor arm 58 is loaded only by the compression spring 72. It is to be understood that in FIG. 5 and in the subsequent drawings, those of the fixed contacts 62, 64, 66 and 68 which are in engagement with the movable contact 70 are shown as black dots, and those out of engagement therewith as white dots, for the sake of clarity.

When the movable contact 70 is in engagement with the two preselected fixed contacts 62 and 64 as above, the transverse drive motor control circuit 182 has both of its LEFT and RIGHT input terminals 186 and 188 grounded, so that the transverse drive motor 42 is held out of rotation. The vertical drive motor control circuit 184, on the other hand, has only its DOWN input terminal 192 grounded, so that the vertical drive motor 44 is set in reverse rotation to cause downward movement of the carriage 144 along the guide 142.

As the sensor assembly 30 travels along the welding path, with its follower stylus 108 in sensing engagement with the path, for guiding the welding torch 22 therealong, the sensor arm 58 may be pivoted in various directions relative to the sensor body 56 as the follower stylus encounters variations in the path. As a result of such pivotal movement of the sensor arm 58 relative to the sensor body 56, the movable contact 70 on the sensor arm is moved as aforesaid into engagement with any one or two adjacent ones of the fixed contacts 62, 64, 66 and 68.

In FIG. 6A, for example, the sensor arm 58 is pivoted against the bias of the compression spring 72 to move the movable contact 70 into engagement with both of the fixed contacts 66 and 68. In this case, the transverse drive motor control circuit 182 has both of its LEFT and RIGHT input terminals 186 and 188 grounded, so that the transverse drive motor 42 is held out of rotation. The vertical drive motor control circuit 184, however, has only its UP input terminal 190 grounded, so that the vertical drive motor 44 is set in forward rotation to cause upward movement of the carrige 144 along the guide 142.

Upon engagement of the movable contact 70 with both of the fixed contacts 62 and 68, as shown in FIG. 6B, the transverse drive motor control circuit 182 has only its LEFT input terminal 186 grounded, so that the transverse drive motor 42 is set in forward rotation to cause leftward movement of the carriage 132 along the guide 130. The vertical drive motor control circuit 184 has both of its UP and DOWN input terminals 190 and 192 grounded, so that the vertical drive motor 44 is held out of rotation.

Upon engagement of the movable contact 70 with both of the fixed contacts 64 and 66, as shown in FIG. 6C, the transverse drive motor control circuit 182 has only its RIGHT input terminal 188 grounded, so that the transverse drive motor 42 is set in reverse rotation to cause rightward movement of the carriage 132 along the guide 130. The vertical drive motor control circuit 184 has both of its UP and DOWN input terminals 190 and 192 grounded, so that the vertical drive motor 44 is held out of rotation.

It is thus seen that in the two-way sensing circuit 180 of the sensing and guiding apparatus in accordance with my invention, the engagement of the movable contact 70 with any two adjacent ones of the fixed contacts 62, 64, 66 and 68 results in the rotation of either of the transverse and the vertical drive motors 42 and 44 in a predetermined direction, while the other drive motor is held out of rotation. FIG. 6D shows the movable contact 70 in neutral, that is, out of engagement with all of the four fixed contacts. Both of the transverse and the vertical drive motors 42 and 44 are then held out of rotation.

The movable contact 70 is further movable into engagement with each individual one of the fixed contacts 62, 64, 66 and 68. In each of these cases, the transverse and the vertical drive motors 42 and 44 are both set in rotation in predetermined directions. For example, in FIG. 6E, the movable contact 70 is shown engaged with the fixed contact 62. As will be apparent from FIG. 5, the transverse drive motor control circuit 182 has then only its LEFT input terminal 186 grounded, so that the transverse drive motor 42 is set in forward rotation to cause leftward movement of the carriage 132 along the guide 130. Simultaneously, the vertical drive motor control circuit 184 has only its DOWN input terminal 192 grounded, so that the vertical drive motor 44 is set in reverse rotation to cause downward movement of the carriage 144 along the guide 142. The sensor assembly 30 and, of course, the welding torch 22 are thus moved both leftward and downward with respect to the welding path.

Upon engagement of the movable contact 70 with the fixed contact 64, as shown in FIG. 6F, the transverse drive motor control circuit 182 has only its RIGHT input terminal 188 grounded, thereby setting the transverse drive motor 42 in reverse rotation and thus causing rightward movement of the carriage 132 along the guide 130. Simultaneously, the vertical drive motor control circuit 184 has only its DOWN input terminal 192 grounded to set the vertical drive motor 44 in reverse rotation and hence to cause downward movement of the carriage 144 along the guide 142. The sensor assembly 30 is therefore moved both rightward and downward with respect to the welding path.

Upon engagement of the movable contact 70 with the fixed contact 66, as shown in FIG. 6G, the transverse drive motor control circuit 182 has only its RIGHT input terminal 188 grounded to set the transverse drive motor 42 in reverse rotation and hence to cause rightward movement of the carriage 132 along the guide 130. Also, the vertical drive motor control circuit 184 has only its UP input terminal 190 grounded to set the vertical drive motor 44 in forward rotation and hence to cause upward movement of the carriage 144 along the guide 142. The sensor assembly 30 is therefore moved both rightward and upward with respect to the welding path.

Upon engagement of the movable contact 70 with the fixed contact 68, as shown in FIG. 6H, the transverse drive motor control circuit 182 has only its LEFT input terminal 186 grounded to set the transverse drive motor 42 in forward rotation and hence to cause leftward movement of the carriage 132 along the guide 130. Also, the vertical drive motor control circuit 184 has only its UP input terminal 190 grounded to set the vertical drive motor 44 in forward rotation and hence to cause upward movement of the carriage 144 along the guide 142. The sensor assembly 30 is therefore moved both leftward and upward with respect to the welding path.

Figure 7:
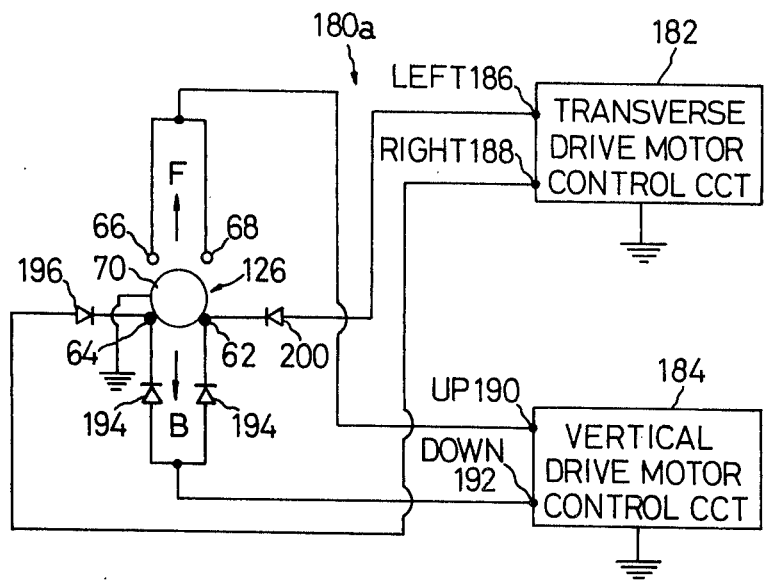
FIG. 7 is a schematic electrical diagram of a modification of the two-way sensing circuit of FIG. 5.

The configuration of the two-way sensing circuit 180 shown in FIG. 5 is subject to modifications such as, for example, that illustrated in FIG. 7 and therein generally designated 180a. In this modified two-way sensing circuit 180a, the two preselected fixed contacts 62 and 64, with which the movable contact 70 is normally spring biased into engagement, are connected in parallel relationship to the DOWN input terminal 192 of the vertical drive motor control circuit 184 via the diodes 194 each connected in series with one of the preselected fixed contacts, as in the two-way sensing circuit 180 of FIG. 5.

The preselected fixed contact 62 in the modified two-way sensing circuit 180a is further connected via the diode 200 to the LEFT input terminal 186 of the transverse drive motor control circuit 182, and the other preselected fixed contact 64 is further connected via the diode 196 to the RIGHT input terminal 188 of the transverse drive motor control circuit 182. The other two fixed contacts 66 and 68 are connected in parallel relationship directly to the UP input terminal 190 of the vertical drive motor control circuit 184. It is understood that the transverse drive motor control circuit 182 and the vertical drive motor control circuit 184 are connected to the transverse and the vertical drive motors 42 and 44, respectively, as shown in FIG. 5.

According to this modified two-way sensing circuit 180a, the fixed contact 62 functions to cause the transverse drive motor control circuit 182 to set the transverse drive motor 42 in forward rotation, resulting in leftward movement of the carriage 132 along the guide 130, and also to cause the vertical drive motor control circuit 184 to set the vertical drive motor 44 in reverse rotation, resulting in downward movement of the carriage 144 along the guide 142. The fixed contact 64 functions to cause the transverse drive motor control circuit 182 to set the transverse drive motor 42 in reverse rotation, resulting in rightward movement of the carriage 132 along the guide 130, and also to cause the vertical drive motor control circuit 184 to set the vertical drive motor 44 in reverse rotation, resulting in downward movement of the carriage 144 along the guide 142. The paired fixed contacts 66 and 68 function only to cause the vertical drive motor control circuit 184 to set the vertical drive motor in forward rotation, resulting in upward movement of the carriage 144 along the guide 142. It will therefore be seen that this modified two-way sensing circuit 180a can also be employed for the two-way sensing operation of the sensing and guiding apparatus 20 in accordance with my invention.

Right Hand Sensing Circuit

Figure 8:
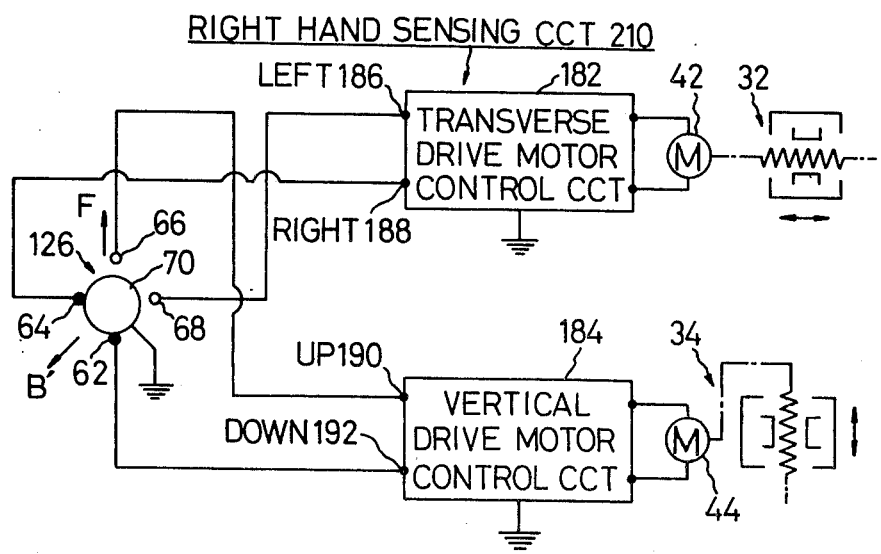
FIG. 8 is a schematic electrical diagram of the right hand sensing circuit in the apparatus of FIG. 1.

It will be noted that, in the right hand sensing circuit generally designated 210 in FIG. 8, the sensor assembly 30 is angularly displaced 45 degrees in a clockwise direction, as viewed in this drawing, about its own axis from its angular position in the two-way sensing circuit 180 of FIG. 5, with respect to its predetermined traveling direction F. Thus, in this right hand sensing circuit 210, the movable contact 70 of the sensor switch 126 is spring biased in a direction B' which is angularly spaced substantially 135 degrees in a counterclockwise direction, as viewed in FIG. 8, from the traveling direction F. Further, the fixed contacts 62 and 66 are aligned in the traveling direction F, and the fixed contacts 64 and 68 are aligned in the transverse direction of the welding path.

As in the two-way sensing circuit 180, the reversible electric motors 42 and 44 of the transverse and the vertical drive mechanisms 32 and 34 are adapted to be individually controlled by the respective motor control circuits 182 and 184. The fixed contacts 62, 64, 66 and 68 of the sensor switch 126 are all individually connected to the respective input terminals of these motor control circuits.

The fixed contact 62 is connected to the DOWN input terminal 192 of the vertical drive motor control circuit 184. The fixed contact 64 is connected to the RIGHT input terminal 188 of the transverse drive motor control circuit 182. The fixed contact 66 is connected to the UP input terminal 190 of the vertical drive motor control circuit 184. The fixed contact 68 is connected to the LEFT input terminal 186 of the transverse drive motor control circuit 182.

FIG. 8 shows the movable contact 70 of the sensor switch 126 as spring biased into engagement with the two preselected fixed contacts 62 and 64, thereby grounding the RIGHT input terminal 188 of the transverse drive motor control circuit 182 and the DOWN input terminal 192 of the vertical drive motor control circuit 184. The transverse drive motor 42 is then set in reverse rotation to cause rightward movement of the carriage 132 along the guide 130, and the vertical drive motor 44 is also set in reverse rotation to cause downward movement of the carriage 144 along the guide 142. The sensor assembly 30 as well as the welding torch 22 is therefore moved both rightward and downward with respect to the welding path.

Figure 9A:
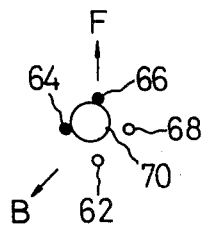
FIGS. 9A through 9H are schematic representations of the sensor switch which are explanatory of the various operating positions of the movable contact with respect to the fixed contacts when the apparatus is in the right hand sensing mode.

Upon engagement of the movable contact 70 with both of the fixed contacts 64 and 66, as shown in FIG. 9A, the transverse drive motor control circuit 182 has only its RIGHT input terminal 188 grounded to set the transverse drive motor 42 in reverse rotation and hence to cause rightward movement of the carriage 132 along the guide 130. The vertical drive motor control circuit 184, on the other hand, has only its UP input terminal 190 grounded to set the vertical drive motor 44 in forward rotation and hence to cause upward movement of the carriage 144 along the guide 142. The sensor assembly 30 is therefore moved both rightward and upward with respect to the welding path.

Figure 9B:
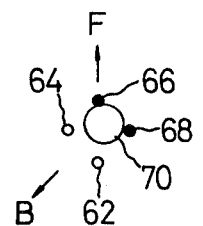

Upon engagement of the movable contact 70 with both of the fixed contacts 66 and 68, as shown in FIG. 9B, the transverse drive motor control circuit 182 has only its LEFT input terminal 186 grounded to set the transverse drive motor 42 in forward rotation and hence to cause leftward movement of the carriage 132 along the guide 130. Also, the vertical drive motor control circuit 184 has only its UP input terminal 190 grounded to set the vertical drive motor 44 in forward rotation and hence to cause upward movement of the carriage 144 along the guide 142. The sensor assembly 30 is therefore moved both leftward and upward with respect to the welding path.

Figure 9C:
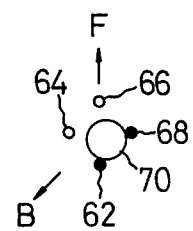

Upon engagement of the movable contact 70 with both of the fixed contacts 62 and 68, as shown in FIG. 9C, the transverse drive motor control circuit 182 has only its LEFT input terminal 186 grounded to set the transverse drive motor 42 in forward rotation and hence to cause leftward movement of the carriage 132 along the guide 130. Also, the vertical drive motor control circuit 184 has only its DOWN input terminal 192 grounded to set the vertical drive motor 44 in reverse rotation and hence to cause downward movement of the carriage 144 along the guide 142. The sensor assembly 30 is therefore moved both leftward and downward with respect to the welding path.

Figure 9D:
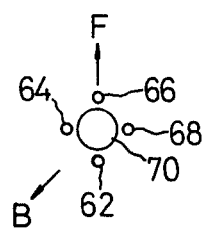

Thus, in this right hand sensing circuit 210, the engagement of the movable contact 70 with any two adjacent ones of the four fixed contacts 62, 64, 66 and 68 results in the simultaneous actuation of the transverse and the vertical drive motors 42 and 44. FIG. 9D shows the movable contact 70 in neutral, or out of engagement with all the fixed contacts, with the result that both transverse and vertical drive motors 42 and 44 are held out of rotation.

It is apparent from the foregoing that upon engagement of the movable contact 70 with each individual one of the four fixed contacts, either of the transverse and the vertical drive motors 42 and 44 is set in rotation in a predetermined direction, as in the following.

Figure 9E:
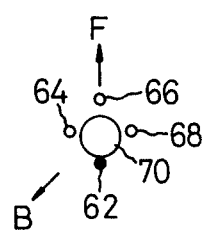
Figure 9F:
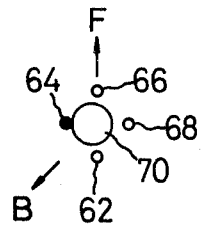
Figure 9G:
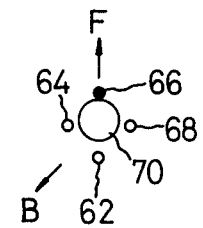
Figure 9H:
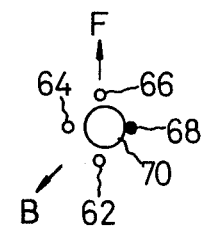

Upon engagement of the movable contact 70 with the fixed contact 62, as shown in FIG. 9E, the DOWN input terminal 192 of the vertical drive motor control circuit 184 is grounded to cause downward movement of the carriage 144 along the guide 142. Upon engagement of the movable contact 70 with the fixed contact 64, as shown in FIG. 9F, the RIGHT input terminal 188 of the transverse drive motor control circuit 182 is grounded to cause rightward movement of the carriage 132 along the guide 130. Upon engagement of the movable contact 70 with the fixed contact 66, as shown in FIG. 9G, the UP input terminal 190 of the vertical drive motor control circuit 184 is grounded to cause upward movement of the carriage 144 along the guide 142. Upon engagement of the movable contact 70 with the fixed contact 68, as shown in FIG. 9H, the LEFT input terminal 186 of the transverse drive motor control circuit 182 is grounded to cause leftward movement of the carriage 132 along the guide 130.

Left Hand Sensing Circuit

Figure 10:
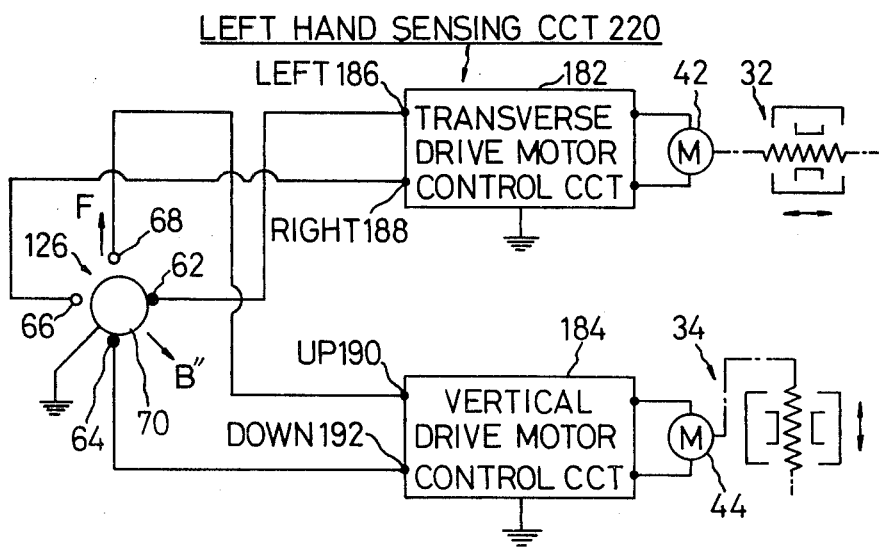
FIG. 10 is a schematic electrical diagram of the left hand sensing circuit in the apparatus of FIG. 1.

In the left hand sensing circuit shown in FIG. 10 and therein generally designated 220, the sensor assembly 30 is angularly displaced 45 degrees in a counterclockwise direction about its own axis from its angular position in the two-way sensing circuit 180 of FIG. 5 with respect to its predetermined traveling direction F. As a consequence, the movable contact 70 of the sensor switch 126 is spring biased in a direction B" which is angularly spaced substantially 135 degrees in a clockwise direction from the traveling direction F. Further, the fixed contacts 64 and 68 of the sensor switch 126 are aligned in the traveling direction F, and the fixed contacts 62 and 66 are aligned in the transverse direction of the welding path.

As in the two-way and the right hand sensing circuits 180 and 210, the reversible motors 42 and 44 of the transverse and the vertical drive mechanisms 32 and 34 are adapted to be individually controlled by the respective motor control circuits 182 and 184. Also, as in the right hand sensing circuit 210, the fixed contacts 62, 64, 66 and 68 of the sensor switch 126 are individually connected to the respective input terminals of the motor control circuits 182 and 184.

The fixed contact 62 is connected to the LEFT input terminal 186 of the transverse drive motor control circuit 182. The fixed contact 64 is connected to the DOWN input terminal 192 of the vertical drive motor control circuit 184. The fixed contact 66 is connected to the RIGHT input terminal 188 of the transverse drive motor control circuit 182. The fixed contact 68 is connected to the UP input terminal 190 of the vertical drive motor control circuit 184.

When the movable contact 70 is held in engagement with both of the fixed contacts 62 and 64 under the bias of the compression spring 72, as shown in FIG. 10, the transverse drive motor control circuit 182 has its LEFT input terminal 186 grounded to cause leftward movement of the carriage 132 along the guide 130, and the vertical drive motor control circuit 184 has its DOWN input terminal 192 grounded to cause downward movement of the carriage 144 along the guide 142. The sensor assembly 30 as well as the welding torch 22 is therefore moved both leftward and downward with respect to the welding path. The other details of operation of this left hand sensing circuit 220 will be evident from the foregoing description of the right hand sensing circuit.

Mode Selector Switches

Figure 11:
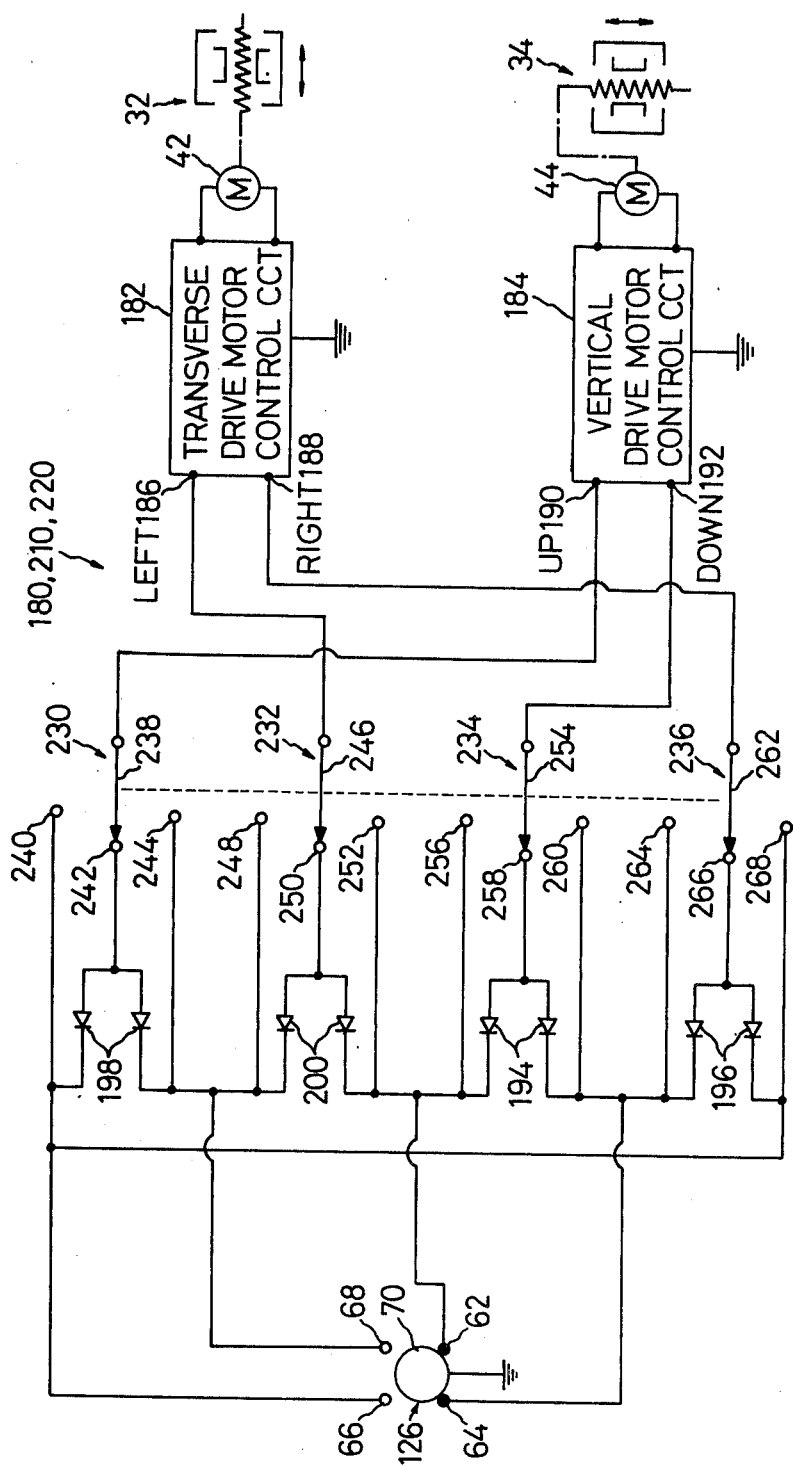
FIG. 11 is a schematic electrical diagram showing in combination the two-way sensing circuit of FIG. 5, the right hand sensing circuit of FIG. 8 and the left hand sensing circuit of FIG. 10, together with mode selector switches for selective use of the three sensing circuits.

In FIG. 11 are shown in combination the two-way sensing circuit 180 of FIG. 5, the right hand sensing circuit 210 of FIG. 8, and the left hand sensing circuit 220 of FIG. 10, together with four mode selector switches 230, 232, 234 and 236 for selective use of the three sensing circuits. The mode selector switch 230 comprises a movable contact 238 connected to the UP input terminal 190 of the vertical drive motor control circuit 184, and three fixed contacts 240, 242 and 244 which can be selectively engaged by the movable contact. The first fixed contact 240 is connected to the fixed contact 66 of the sensor switch 126. The second fixed contact 242 is connected via the reverse blocking diodes 198 to both of the fixed contacts 66 and 68 of the sensor switch. The third fixed contact 244 is connected to the fixed contact 68 of the sensor switch. The movable contact 238 of this mode selector switch 230 is to be set to the first fixed contact 240 for the right hand sensing operation, to the second fixed contact 242 for the two-way sensing operation, and to the third fixed contact 244 for the left hand sensing operation.

The mode selector switch 232 comprises a movable contact 246 connected to the LEFT input terminal 186 of the transverse drive motor control circuit 182, a first fixed contact 248 connected to the fixed contact 68 of the sensor switch 126, a second fixed contact 250 connected via the reverse blocking diodes 200 to both of the fixed contacts 62 and 68 of the sensor switch, and a third fixed contact 252 connected to the fixed contact 62 of the sensor switch. The movable contact 246 of the mode selector switch 232 is to be set to the first fixed contact 248 for the right hand sensing operation, to the second fixed contact 250 for the two-way sensing operation, and to the third fixed contact 252 for the left hand sensing operation.

The mode selector switch 234 comprises a movable contact 254 connected to the DOWN input terminal 192 of the vertical drive motor control circuit 184, a first fixed contact 256 connected to the fixed contact 62 of the sensor switch 126, a second fixed contact 258 connected via the reverse blocking diodes 194 to both of the fixed contacts 62 and 64 of the sensor switch, and a third fixed contact 260 connected to the fixed contact 64 of the sensor switch. The movable contact 254 of this mode selector switch 234 is to be set to the first fixed contact 256 for the right hand sensing operation, to the second fixed contact 258 for the two-way sensing operation, and to the third fixed contact 260 for the left hand sensing operation.

The mode selector switch 236 comprises a movable contact 262 connected to the RIGHT input terminal 188 of the transverse motor control circuit 182, a first fixed contact 264 connected to the fixed contact 64 of the sensor switch 126, a second fixed contact 266 connected via the reverse blocking diodes 196 to both of the fixed contacts 64 and 66 of the sensor switch, and a third fixed contact 268 connected to the fixed contact 66 of the sensor switch. The movable contact 262 of the mode selector switch 236 is to be set to the first fixed contact 264 for the right hand sensing operation, to the second fixed contact 266 for the two-way sensing operation, and to the third fixed contact 268 for the left hand sensing operation.

Although not specifically illustrated, it is understood that the movable contacts 238, 246, 254 and 262 of the mode selector switches 230, 232, 234 and 236 are all ganged together for simultaneous operation by the mode selector knob 54 on the control console 36 of FIG. 1. Thus, for example, when the mode selector knob 54 is manipulated to set the movable contacts 238, 246, 254 and 262 of the mode selector switches to their second fixed contacts 242, 250, 258 and 266, respectively, as represented in FIG. 11, the fixed contacts 62 and 64 of the sensor switch 126 are connected to the DOWN input terminal 192 of the vertical drive motor control circuit 184 via the diodes 194 and the selector switch 234. The fixed contacts 64 and 66 of the sensor switch are connected to the RIGHT input terminal 188 of the transverse drive motor control circuit 182 via the diodes 196 and the selector switch 236. The fixed contacts 66 and 68 of the sensor switch are connected to the UP input terminal 190 of the vertical drive motor control circuit 184 via the diodes 198 and the selector switch 230. The fixed contacts 62 and 68 of the sensor switch are connected to the LEFT input terminal 186 of the transverse drive motor control circuit 182 via the diodes 200 and the selector switch 232.

It is thus seen that the sensor switch 126 is connected to the transverse and the vertical drive motor control circuits 182 and 184 via the two-way sensing circuit 180 of FIG. 5 upon setting of the movable contacts 238, 246, 254 and 262 of the mode selector switches 230, 232, 234 and 236 to the fixed contacts 242, 250, 258 and 266. Likewise, the right hand sensing circuit 210 of FIG. 8 is established between the sensor switch and the motor control circuits upon setting of the movable contacts of the mode selector switches to the fixed contacts 240, 248, 256 and 264, and the left hand sensing circuit 220 of FIG. 10 is established therebetween upon setting of the movable contacts of the mode selector switches to the fixed contacts 244, 252, 260 and 268.

Figure 12:
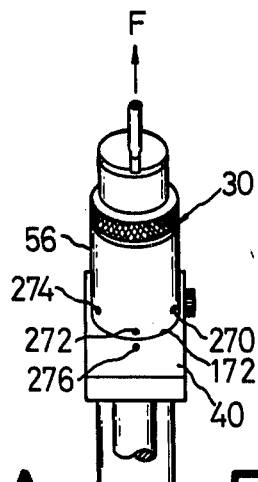
FIG. 12 is a fragmentary top plan view of the sensor assembly and its holder, the view showing in particular the marks formed on the sensor assembly and its holder to facilitate the adjustment of the angular position of the sensor assembly relative to the holder according to which one of the three sensing circuits is to be used.

For switching the sensing and guiding apparatus 20 from one sensing mode to another, not only must the mode selector knob 54 be manipulated as above, but also, as mentioned in connection with FIGS. 5, 8 and 10, the sensor assembly 30 must be turned to either of the three prescribed angular positions about its own axis with respect to its traveling direction F. Such adjustment of the angular position of the sensor assembly 30 will be greatly facilitated if, as shown in FIG. 12, three suitable marks 270, 272 and 274 are formed on the external surface of the sensor body 56, just above its annular stop 172, at angular spacings of 45 degrees, and another mark 276 on the sensor holder 40. The holder mark 276 is to be set to the sensor mark 270 for the right hand sensing operation, to the sensor mark 272 for the two-way sensing operation, and to the sensor mark 274 for the left hand sensing operation.

OPERATION

Figure 13A:
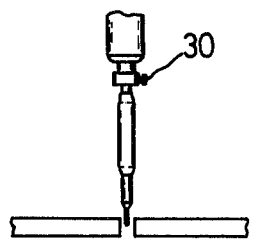
FIGS. 13A and 13B are schematic representations of additional examples of types of joints along which a welding head may most suitably be guided in the two-way sensing mode by the apparatus of my invention.
Figure 13B:
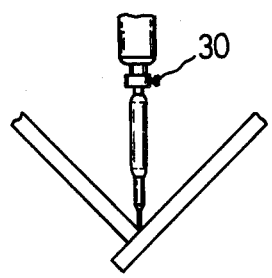
Figure 14A:
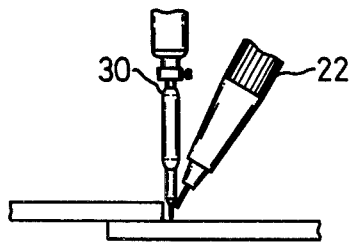
FIGS. 14A through 14C are schematic representations of some types of joints along which a welding head may most suitably be guided in the right or the left hand sensing mode by the apparatus of my invention.
Figure 14B:
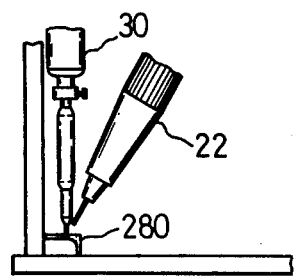
Figure 14C:
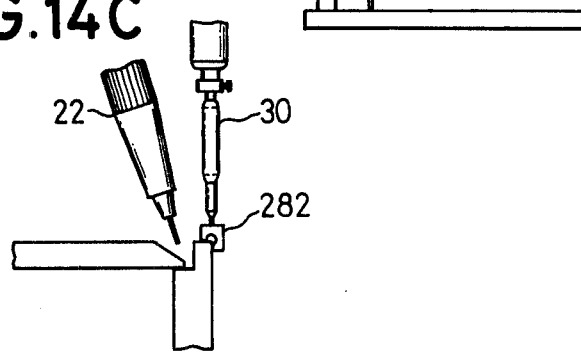

While the operation of the sensing and guiding apparatus 20 is believed to be apparent from the foregoing, further amplification will be made in the following brief summary of such operation. The apparatus 20 may be operated in the two-way sensing mode for such forms of joints as the V-type butt joint shown in FIG. 1, the I-type butt joint shown in FIG. 13A, and the flat-position fillet joint shown in FIG. 13B. Either the right or the left hand sensing mode may be adopted for such forms of joints as the lap joint shown in FIG. 14A, the horizontal position fillet joint shown in FIG. 14B, and the corner joint shown in FIG. 14C. Further, if desired or required, suitable adapters may be employed in place of the follower stylus 108, as shown by way of example at 280 and 282 in FIGS. 14B and 14C.

Regardless of the sensing mode of the apparatus 20, it is important that the sensor assembly 30 be disposed in the correct position relative to the welding torch 22, so as to precede the latter along the desired welding path. Either or both of the knobs 154 and 160 of the manual adjuster 38 may be suitably manipulted for such fine adjustment of the position of the sensor assembly 30 relative to the welding torch. It is to be noted, however, that the sensor assembly 30 may not necessarily precede the welding torch. In some applications of the apparatus in accordance with my invention, the sensor assembly 30 may be disposed in side-by-side relationship to the welding torch 22 or its equivalent.

Two-Way Sensing Mode

For guiding the welding torch 22 along the V-type groove 24 between the coplanar pieces 26 and 28 of sheet metal to be butt-welded, the apparatus 20 may be set in the two-way sensing mode through the following procedure. With the screw 168 on the sensor holder 40 loosened, the sensor assembly 30 may be manually turned relative to the sensor holder to adjust the two-way sensing mode mark 272 thereon to the holder mark 276, so that the movable contact 70 of the sensor switch 126 is biased by the compression spring 72 in the direction B, FIG. 5, that is substantially opposite to the traveling direction F. The screw 168 is then tightened to secure the sensor assembly 30 to the holder 40 in the desired angular position.

As explained above in connection with FIG. 11, the mode selector knob 54 on the control console 36 is also manipulated to set the movable contacts 238, 246, 254 and 262 of the mode selector switches 230, 232, 234 and 236 to the fixed contacts 242, 250, 258 and 266, respectively, thereby connecting the two-way sensing circuit 180 of FIG. 5 between the sensor switch 126 and the transverse and the vertical drive motor control circuits 182 and 184.

The electrical circuitry of the apparatus 20 may now be switched on to move the welding torch 22 and the sensor assembly 30 to their proper relative positions with respect to the groove 24 between the sheet metal pieces 26 and 28. Since the sensor arm 58 is initially loaded only by the compression spring 72, the movable contact 70 of the sensor switch 126 is held in engagement with the two preselected fixed contacts 62 and 64. The result of this is the reverse rotation of the vertical drive motor 44, so that the sensor assembly 30 as well as the welding torch 22 is moved downward by the vertical drive mechanism 34 until the follower stylus 108 of the sensor assembly is forced against either of the right and the left sheet metal pieces 26 and 28.

Upon forced contact of the follower stylus 108 with one of the sheet metal pieces 26 and 28, the sensor arm 58 is pivoted against the bias of the compression spring 72 to move the movable contact 70 to the neutral position of FIG. 6D, in which the movable contact is out of engagement with all the fixed contacts 62, 64, 66 and 68. For subsequently moving the sensor assembly 30 into proper sensing engagement with the groove 24, a light finger pressure may be exerted on its follower unit 100 in the direction of the groove. For example, if the sensor assembly is then located on the right hand piece of sheet metal 26, a leftward finger pressure may be exerted on the follower unit 100, thereby causing the movable contact 70 to move into engagement with both of the fixed contacts 62 and 68 as shown in FIG. 6B. The transverse drive motor 42 is then set in forward rotation to cause leftward movement of the sensor assembly 30 until the follower stylus 108 reaches the groove 24.

This groove 24 is assumed to be of the V type. Therefore, when the follower stylus 108 reaches the groove 24, the sensor arm 58 is so loaded by the right hand one of the opposite sloping walls of the groove that the movable contact 70 is moved into engagement with only the fixed contact 62 as shown in FIG. 6E. This fixed contact 62 is connected to the LEFT input terminal 186 of the transverse drive motor control circuit 182 and to the DOWN input terminal 192 of the vertical drive motor control circuit 184. Both the transverse and the vertical drive motors 42 and 44 are therefore set in rotation in the predetermined directions to move the sensor assembly 30 leftward and downward, until the follower stylus 108 reaches the bottom or vertex of the V-type groove 24.

Thereupon the sensor arm 58 is again loaded so that the movable contact 70 is moved out of engagement with the fixed contact 62 and is re-neutralized as in FIG. 6D. The sensor assembly 30 is now in proper sensing engagement with the groove 24 and is ready to guide the welding torch 22 therealong in the two-way sensing mode. Of course, the welding torch 22 is disposed in proper welding relationship to the joint when the sensor assembly 30 is positioned thereon. The apparatus 20 together with the welding torch 22 may now be fed along the groove 24 by the unshown feed mechanism to commence guiding the torch therealong.

Upon encountering an upward variation in the welding path, the sensor assembly 30 has its arm 58 pivoted against the bias of the compression spring 72 to move the movable contact 70 into engagement with both of the fixed contacts 66 and 68. As previously set forth in connection with FIG. 5, only the vertical drive motor 44 is then set in forward rotation to cause upward movement of the carriage 144 along the guide 142. Both welding torch 22 and sensor assembly 30 are thus moved upward to and extent corresponding to the upward variation in the path, that is, until the movable contact 70 of the sensor switch 126 is re-neutralized.

Upon encountering a downward variation in the welding path, the sensor assembly 30 has its arm 58 loaded by the compression spring 72 and thereby pivoted in the direction B until the movable contact 70 thereon moves into engagement with both of the fixed contacts 62 and 64. The vertical drive motor 44 is then set in reverse rotation to cause downward movement of the carriage 144 along the guide 142. Both welding torch 22 and sensor assembly 30 are thus moved downward until the movable contact 70 of the sensor switch 126 is re-neutralized.

Upon encountering a leftward variation in the welding path, the follower stylus 108 of the sensor assembly 30 is thereby moved leftwardly, resulting in the pivotal movement of the sensor arm 58 in such a direction that the movable contact 70 thereon moves into engagement with both of the fixed contacts 62 and 68. Thereupon the transverse drive motor 42 is set in forward rotation to cause leftward movement of the carriage 132 along the guide 130. Both welding torch 22 and sensor assembly 30 are thus moved leftward until the movable contact 70 of the sensor switch is re-neutralized.

Upon encountering a rightward variation in the welding path, the follower stylus 108 of the sensor assembly 30 is thereby moved rightward to cause pivotal movement of the sensor arm 58 in such a direction that the movable contact 70 thereon moves into engagement with both of the fixed contacts 64 and 66. The transverse drive motor 42 is then set in reverse rotation to cause rightward movement of the carriage 132 along the guide 130. Both welding torch 22 and sensor assembly 30 are therefore moved rightward until the movable contact 70 of the sensor switch 126 is re-neutralized.

The sensor assembly 30 may further encounter a combined downward and leftward variation in the welding path. In this case, the sensor arm is so loaded by the variation that the movable contact 70 thereon moves into engagement with only the fixed contact 62. The transverse drive motor 42 is then set in forward rotation to cause leftward movement of the carriage 132 along the guide 130, and the vertical drive motor 44 is simultaneously set in reverse rotation to cause downward movement of the carriage 144 along the guide 142. Both welding torch 22 and sensor assembly 30 are therefore moved both leftward and downward until the movable contact 70 is re-neutralized.

The apparatus 20 likewise responds to a combined downward and rightward variation, a combined upward and rightward variation, and a combined upward and leftward variation in the welding path, and correspondingly controls the movement of the welding torch 22 for guiding same along the path in spite of such variations.

It is apparent from the foregoing that during operation in the two-way sensing mode, the sensing and guiding apparatus of my invention effectively senses both rightward and leftward variations in the path, in addition to upward and downward variations and any combinations of such variations, so that the welding torch 22 can be guided accurately along the V-type groove 24 for welding the sheet metal pieces 26 and 28 at the exact joint therebetween. Furthermore, since the movable contact 70 of the sensor switch 126 is normally spring biased into engagement with the two preselected fixed contacts 62 and 64, causing downward movement of the welding torch 22 and sensor assembly 30, and is neutralized upon proper sensing engagement of the follower stylus 108 with the groove 24, there is no possibility of the sensor assembly deviating accidentally from the path.

Right Hand Sensing Mode

For operation in the right hand sensing mode, the sensor assembly 30 may be manually turned relative to the sensor holder 40, while the screw 168 is loosened, to adjust the right hand sensing mode mark 270 to the holder mark 276. The movable contact 70 of the sensor switch 126 is then biased by the compression spring 72 in the direction B' of FIG. 8. The mode selector knob 54 on the control console 36 is also manipulated to set the movable contacts 238, 246, 254 and 262 of the mode selector switches 230, 232, 234 and 236 to the fixed contacts 240, 248, 256 and 264, respectively, thereby connecting the right hand sensing circuit 210 of FIG. 8 between the sensor switch 126 and the transverse and the vertical drive motor control circuits 182 and 184.

Let it be assumed that the path to be followed by the sensor assembly 30 in the right hand sensing mode is defined right-angularly by a vertical and a horizontal surface, with the vertical surface disposed on the right hand side of the sensor assembly. Since the sensor arm 58 is initially loaded only by the compression spring 72, the movable contact 70 of the sensor switch 126 is in engagement with the two preselected fixed contacts 62 and 64 which, in this right hand sensing circuit 210, are connected respectively to the DOWN input terminal 192 of the vertical drive motor control circuit 184 and to the RIGHT input terminal 188 of the transverse drive motor control circuit 182.

The sensor assembly 30 as well as the welding torch 22 is therefore moved both downward and rightward until the follower stylus 108 of the sensor assembly makes abutting contact with, for example, the horizontal surface defining the welding path. Thereupon the sensor arm 58 is pivoted against the bias of the compression spring 72 to move the movable contact 70 thereon out of engagement with the fixed contact 62. The movable contact 70, however, is still maintained in engagement with the fixed contact 64 connected to the RIGHT input terminal 188 of the transverse drive motor control circuit 182. As a consequence, the sensor assembly 30 continues traveling rightward to the welding path.

If the follower stylus 108 of the sensor assembly 30 first moves into contact with the vertical surface defining the welding path, then the sensor arm 58 is so loaded that the movable contact 70 moves out of engagement with the fixed contact 64 and remains in engagement with only the fixed contact 62 connected to the DOWN input terminal 192 of the vertical drive motor control circuit 184. The sensor assembly 30 thus continues traveling downward to the welding path.

Upon proper engagement of the follower stylus 108 with the welding path, the sensor arm 58 is again so loaded that the movable contact 70 is neutralized, and the sensor assembly 30 is now ready to guide the welding torch 22 along the welding path in the right hand sensing mode. The apparatus 20 together with the welding torch 22 may then be fed along the path by the unshown feed mechanism.

The sensor assembly 30 traveling along the welding path may encounter variations therein in various directions. Upon encountering, for example, an upward variation in the path, the sensor assembly 30 has its arm 58 so loaded that the movable contact 70 moves into engagement with the fixed contact 66 connected to the UP input terminal 190 of the vertical drive motor control circuit 184. Both welding torch 22 and sensor assembly 30 are therefore moved upward to an extent corresponding to the upward variation in the path, that is, until the movable contact 70 is re-neutralized.

Upon encountering a combined downward and leftward variation in the welding path, the sensor assembly 30 has its arm 58 so loaded that the movable contact 70 moves into engagement with both of the fixed contact 62 connected to the DOWN input terminal 192 of the vertical drive motor control circuit 184 and the fixed contact 68 connected to the LEFT input terminal 186 of the transverse drive motor control circuit 182. Both welding torch 22 and sensor assembly 30 are therefore moved downward and leftward until the movable contact 70 is re-neutralized. The other details of the right hand sensing operation of the apparatus 20 are considered apparent from the foregoing description of FIGS. 8 and 9A through 9H.

It will also have been seen that during operation in the right hand sensing mode, the movable contact 70 of the sensor switch 126 is normally spring biased into engagement with both of the fixed contacts 62 and 64 which are connected to the DOWN input terminal of the vertical drive motor control circuit and the RIGHT input terminal of the transverse drive motor control circuit, causing both downward and rightward movement of the welding torch and sensor assembly. Further, upon proper sensing engagement of the sensor assembly with the welding path, the sensor switch is neutralized, so that the welding torch can be guided accurately along the path.

Left Hand Sensing Mode

For the left hand sensing operation, the sensor assembly 30 may be manually turned relative to the sensor holder 40 to adjust the left hand sensing mode mark 274 to the holder mark 276, so that the movable contact 70 of the sensor switch 126 is spring biased in the direction B" of FIG. 10. The mode selector knob 54 is also manipulated to set the movable contacts 238, 246, 254 and 262 of the mode selector switches 230, 232, 234 and 236 to the fixed contacts 244, 252, 260 and 268, respectively, thereby connecting the left hand sensing circuit 220 of FIG. 10 between the sensor switch 126 and the transverse and the vertical drive motor control circuits 182 and 184.

Thus, during operation in the left hand sensing mode, the movable contact 70 of the sensor switch 126 is normally connected to the DOWN input terminal 192 of the vertical drive motor control circuit 184 and to the LEFT input terminal 186 of the transverse drive motor control circuit 182, causing both downward and rightward movement of the welding torch 22 and sensor assembly 30 with respect to the welding path. As in the two-way and right hand sensing modes, the sensor switch 126 is held in neutral during proper sensing engagement of the sensor assembly 30 with the welding path, so that it is evident that the welding torch 22 can be guided accurately along the path.

Although I have shown and described the sensing and guiding apparatus of my invention as adapted for guiding a welding torch along a joint or seam to be welded, it is understood that this adaptation is purely by way of example, the apparatus of my invention being readily adaptable for guiding other pieces of equipment along a predetermined path. Furthermore, my invention is not to be restricted by the exact constructional or operational details disclosed herein but is inclusive of numerous modifications or variations falling within the proper scope or fair meaning of the following claims.

I claim:

1. An apparatus for guiding a piece of equipment along a predetermined path and, upon sensing variations in the path, for correspondingly controlling the movement of such piece of equipment, comprising:
   (a) a sensor assembly for sensing variations in the path by traveling in a predetermined direction therealong together with the guided piece, the sensor assembly comprising:
      (1) a hollow elongated body;
      (2) an arm disposed within the body and supported intermediate its ends for pivotal movement in any direction, one end of the arm extending out of the body for sensing engagement with the path;
      (3) first, second, third and fourth fixed contacts mounted within the body adjacent the other end of the arm and disposed at constant angular spacings about the axis of the body;
      (4) a movable contact of substantially circular shape fixedly mounted on said other end of the arm and having a diameter greater than the distance between any two adjacent ones of the fixed contacts, whereby the movable contact is selectively engageable with any one or two adjacent ones of the fixed contacts depending upon a direction in which the arm is pivoted relative to the body by a variation in the path; and,
      (5) means on the body biasing said other end of the arm in a direction substantially opposite to the predetermined traveling direction of the sensor assembly along the path, whereby the movable contact on the arm is normally held engaged with the first and second fixed contacts which are disposed adjacent to each other;
   (b) first drive means for moving the sensor assembly and the guided piece in the opposite transverse directions of the path, the first drive means including a first electrically controlled actuator;
   (c) second drive means for moving the sensor assembly and the guided pieces in opposite vertical directions with respect to the path, the second drive means including a second electrically controlled actuator; and,
   (d) electrical circuit means connected between the four fixed contacts and the first and second actuators for controlling the operation of the first and second drive means according to which one or ones of the fixed contacts are engaged by the movable contact, the circuit means being effective to cause the first and second drive means to move the sensor assembly and the guided piece:

(1) downward when the movable contact is engaged with both first and second fixed contacts;
(2) upward when the movable contact is engaged with both third and fourth fixed contacts;
(3) in one transverse direction when the movable contact is engaged with both second and third fixed contacts;
(4) in the opposite transverse direction when the movable contact is engaged with both first and fourth fixed contacts;
(5) in both downward and said opposite transverse directions when the movable contact is engaged with only the first fixed contact;
(6) in both downward and said one transverse directions when the movable contact is engaged with only the second fixed contact;
(7) in both upward and said one transverse directions when the movable contact is engaged with only the third fixed contact; and,
(8) in both upward and said opposite transverse directions when the movable contact is engaged with only the fourth fixed contact.

2. The apparatus as claimed in claim 1 wherein the four fixed contacts of the sensor assembly are in the form of pins supported at one end of the body so as to extend toward the other end thereof.

3. The apparatus as claimed in claim 1, wherein the sensor assembly further comprises a follower unit removably secured to said one end of the arm for sensing engagement with the path, the follower unit including flexible means adapted to prevent excessive pivotal movement of the arm upon encountering a violent variation in the path.

4. An apparatus for guiding a piece of equipment along a predetermined path and, upon sensing variations in the path in either a two-way or a one-way sensing mode, for correspondingly controlling the movement of such a piece of equipment, comprising:
 (a) a sensor assembly for sensing variations in the path by traveling in a predetermined direction therealong together with the guided piece, the sensor assembly comprising:
  (1) a hollow elongated body;
  (2) an arm disposed within the body and supported intermediate its ends for pivotal movement in any direction, one end of the arm extending out of the body for sensing engagement with the path;
  (3) a first, second, a third and a fourth fixed contact mounted within the body adjacent the other end of the arm and disposed at constant angular spacings of 90 degrees about the axis of the body;
  (4) a movable contact of substantially circular shape fixedly mounted on said other end of the arm and having a diameter greater than the distance between any two adjacent ones of the fixed contacts, whereby the movable contact is selectively engageable with any one of two adjacent ones of the fixed contacts depending upon a direction in which the arm is pivoted relative to the body by a variation in the path; and,
  (5) means on the body biasing said other end of the arm in such a direction that the movable contact thereon is normally held engaged with the first and second fixed contacts which are disposed adjacent to each other;
 (b) means for adjustably varying the angular position of the sensor assembly about its axis relative to work defining the path, the sensor assembly being held in such an angular position when the apparatus is in a two-way sensing mode that the direction in which said other end of the arm is biased is substantially opposite to the predetermined traveling direction of the sensor assembly along the path, the sensor assembly being further held when the apparatus is in first and second one-way sensing modes, in respective angular positions spaced 45 degrees in opposite directions from its angular position in the two-way sensing mode;
 (c) first drive means for moving the sensor assembly and the guided piece in the opposite transverse directions of the path, the first drive means including a first electrically controlled actuator;
 (d) second drive means for moving the sensor assembly and the guided piece in opposite vertical directions with respect to the path, the second drive means including a second electrically controlled actuator;
 (e) two-way sensing circuit means adapted to be connected between the four fixed contacts and the first and second actuators, the two-way sensing circuit means being effective to cause the first and second drive means to move the sensor assembly and the guided piece;
  (1) downward when the movable contact is engaged with both first and second fixed contacts;
  (2) upward when the movable contact is engaged with both third and fourth fixed contacts;
  (3) in one transverse direction when the movable contact is engaged with both second and third fixed contacts;
  (4) in the opposite transverse direction when the movable contact is engaged with both first and fourth fixed contacts;
  (5) in both downward and said opposite transverse directions when the movable contact is engaged with only the first fixed contact;
  (6) in both downward and said one transverse directions when the movable contact is engaged with only the second fixed contact;
  (7) in both upward and said one transverse directions when the movable contact is engaged with only the third fixed contact; and,
  (8) in both upward and said opposite transverse directions when the movable contact is engaged with only the fourth fixed contact;
 (f) first one-way sensing circuit means adapted to be connected between the four fixed contacts and the first and second actuators, the first one-way sensing circuit means being effective to cause the first and the second drive means to move the sensor assembly and the guided piece;
  (1) downward when the movable contact is engaged with only the first fixed contact;
  (2) in said one transverse direction when the movable contact is engaged with only the second fixed contact;
  (3) upward when the movable contact is engaged with only the third fixed conatct; and,
  (4) in said opposite transverse direction when the movable contact is engaged with only the fourth fixed contact;
  (5) whereby when the movable contact is engaged with both first and second fixed contacts, for example, the sensor assembly and the guided piece are moved in both downward and said one transverse directions;

(g) second one-way sensing circuit means adapted to be connected between the four fixed contacts and the first and second actuators, the second one-way sensing circuit means being effective to cause the first and the second drive means to move the sensor assembly and the guided piece:
  (1) in said opposite transverse direction when the movable contact is engaged with only the first fixed contact;
  (2) downward when the movable contact is engaged with only the second fixed contact;
  (3) in said one transverse direction when the movable contact is engaged with only the third fixed contact; and,
  (4) upward when the movable contact is engaged with only the fourth fixed contact;
  (5) whereby, when the movable contact is engaged with both first and second fixed contacts, for example, the sensor assembly and the guided piece are moved in both said opposite transverse and downward directions; and, (h) switch means for selectively connecting the two-way, the first one-way and the second one-way sensing circuit means between the four fixed contacts and the first and second actuators.

5. The apparatus as claimed in claim 4, wherein the movable contact of the sensor assembly is maintained at ground potential.

6. The apparatus as claimed in claim 5, including a pair of actuator control circuits each having two outputs connected to one of the first and second actuators and two inputs adapted to be selectively connected to the two-way, the first one-way, and the second one-way sensing circuit means by the switch means, each actuator control circuit being adapted to energize the corresponding one of the first and the second actuators in a predetermined direction when either of the two inputs thereof is grounded via the movable contact of the sensor assembly.

* * * * *